(12) United States Patent
Kanitz et al.

(10) Patent No.: US 8,300,296 B2
(45) Date of Patent: Oct. 30, 2012

(54) ELECTROCHROMIC FORMULATION AND ORGANIC ELECTROCHROMIC SWITCHABLE ELECTRONIC COMPONENT

(75) Inventors: Andreas Kanitz, Höchstadt (DE); Wolfgang Roth, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 12/926,458

(22) Filed: Nov. 18, 2010

(65) Prior Publication Data
US 2011/0128606 A1 Jun. 2, 2011

Related U.S. Application Data

(63) Continuation of application No. PCT/EP2009/055994, filed on May 18, 2009.

(51) Int. Cl.
*G02F 1/15* (2006.01)
*G02B 5/23* (2006.01)
(52) U.S. Cl. ......... 359/265; 359/273; 359/275; 252/586
(58) Field of Classification Search .......... 359/265–275; 252/586
See application file for complete search history.

(56) References Cited

U.S. PATENT DOCUMENTS

| | | | |
|---|---|---|---|
| 3,856,714 A | 12/1974 | Moore et al. | |
| 4,841,021 A | 6/1989 | Katritzky et al. | |
| 6,327,069 B1 * | 12/2001 | Allemand et al. | 359/265 |
| 2005/0162728 A1 * | 7/2005 | Warner et al. | 359/273 |
| 2009/0040589 A1 * | 2/2009 | Kanitz et al. | 359/273 |

FOREIGN PATENT DOCUMENTS

| | | |
|---|---|---|
| DE | 10 2008 024 260.8 | 5/2008 |
| EP | 0 319 156 | 6/1989 |
| WO | 2004/113190 | 12/2004 |
| WO | 2007/006767 | 1/2007 |
| WO | 2007/107487 | 9/2007 |
| WO | 2008/037643 | 4/2008 |
| WO | PCT/EP2009/055994 | 5/2009 |

OTHER PUBLICATIONS

Lijun Liang et al., "Preparation of Viologen Polymers with Carbon Chain Spacers and their Application to the Electron-transfer Reaction in Heterophases," Polymers for Advanced Technologies, vol. 10, 1999, pp. 60-64.
International Search Report for PCT/EP2009/055994, mailed on Aug. 18, 2009.

* cited by examiner

*Primary Examiner* — Evelyn A. Lester
(74) *Attorney, Agent, or Firm* — Staas & Halsey LLP

(57) ABSTRACT

An electrochemical formulation has an active dye. An organic electrochromic switchable electronic component of high switching speed is made using the dye. The component is used to make electrochromic displays. The dye has substituents limiting or preventing a π-merisation of the aromatic moieties.

4 Claims, 1 Drawing Sheet

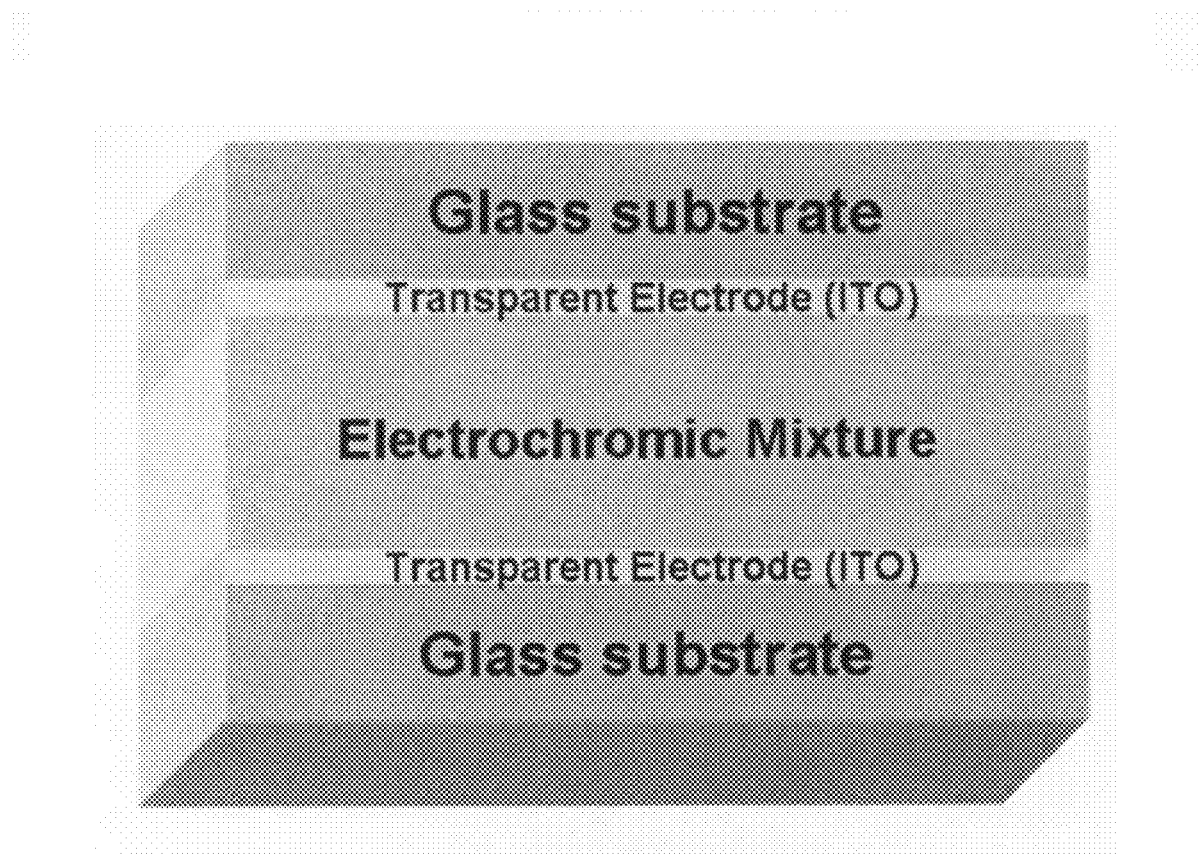

ELECTROCHROMIC FORMULATION AND ORGANIC ELECTROCHROMIC SWITCHABLE ELECTRONIC COMPONENT

CROSS REFERENCE TO RELATED APPLICATIONS

This application is a continuation filed under 35 U.S.C. §111(a) of International Application No. PCT/EP2009/055994, filed on May 18, 2009 which claims priority to German Application No. 10 2008 024 260.8, filed on May 20, 2008, the entire contents of which are incorporated herein by reference.

BACKGROUND

The present invention relates to an electrochromic formulation comprising a novel dye and an organic electrochromically switchable electronic component.

Electrochromic displays based on organic materials normally comprise an active electrochromic layer which, in the case of a display, is between two electrodes at right angles to one another. Essential constituents of the active layer are a redox system and a pH-active dye. The application of a voltage shifts the concentration ratio of the redox partners relative to one another within the material. This reaction releases or binds protons or ions within the material, which affects the pH. If a voltage is applied to the material, the shift in the equilibrium of the redox partners at the two electrodes runs in opposite directions. This leads to a rise in the pH at one of the electrodes, while it falls at the counter-electrode. A pH-active dye is then used to convert the change in the pH to a color change in the material, and to make the application of the voltage visible.

One way in principle of implementing electrochromic displays is to bring about the color change not by a change in the pH in the display but to use the redox processes which take place in any case, in order to generate high-contrast color change by the formation of reductive and/or oxidative states in suitable materials. In this context, the materials known as viologens and polythiophenes in particular have become known as material classes.

PCT/EP2006/064048 discloses corresponding dyes which have been found to be useful.

Electrochromically active formulations switch reversibly between two color states which are defined by the type of electrochromically active dye. For example, a dye based on a viologen structure is colorless in the unswitched state or white owing to the white pigment, but violet in the switched state.

SUMMARY

It is one potential object to enable further color effects in electrochromic components by variation of the dyes.

The inventors propose the preparation of an electrochromically active dye of the viologen type, but which, by virtue of substituent effects, does not switch from colorless to violet as usual, but to a bright blue.

According to the inventors' proposal, an electrochromic formulation is proposed, which comprises at least one electrochromically active dye which has the following structure

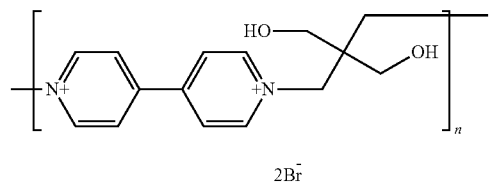

where n=any number, according to the degree of polymerization.

The inventors also propose an organic electrochromic electronic component comprising at least two electrodes and at least one organic active layer in between, wherein the organic active layer comprises at least one formulation comprising the abovementioned dyes.

BRIEF DESCRIPTION OF THE DRAWING

These and other objects and advantages of the present invention will become more apparent and more readily appreciated from the following description of the preferred embodiments, taken in conjunction with the accompanying drawing of which:

FIG. 1 is a perspective view of an electrochromic display.

DETAILED DESCRIPTION OF THE PREFERRED EMBODIMENT

Reference will now be made in detail to the preferred embodiments of the present invention, examples of which are illustrated in the accompanying drawing.

FIG. 1 is a perspective view of a working cell for an electrochromic display. The working cell for the electrochromic display is made by placing an electrochromic material between two transparent electrodes (potentially Indium Tin Oxide, better known as ITO, electrodes). The coloring of the electrochromic material is caused by changing the potential of the cell by charging the transparent electrodes. The electrodes and the electrochromic mixture are sandwiched between a pair of substrates, perhaps glass substrates.

In a preferred embodiment, the value of the index n is in the range from 5 to 300.

The new color is probably achieved by prevention of the stacking of the 4,4'-bipyridine units (which is also referred to as π-merization), and this allows the dye to switch to a bright blue. In this case, the hydroxyl functionalities block the stacking to π-mers.

It is a further advantage of the formulation comprising the novel dye that the dye, in its formulation in the display, by virtue of the substituent effects, has very rapid switch-on and switch-off performance in the range of 60-100 ms (usually in the range from 0.5 to 2 seconds). At the same time, the substituent effects in the switched state also increase the color depth, as a result of which a higher contrast can be achieved at a lower power consumption.

The new type of viologen dyes therefore exhibits some advantages over those known to date, from the new color through the higher color depth with lower power consumption and thus stress on the component, and finally the rapid switching performance.

Working Examples

1) Preparation of the electrochromically active dye: poly-2,2-dihydroxymethylpropylene-4,4'-bipyridylium dibromide 15.6 g of 4,4'-bipyridyl and 26.2 g of 1,3-(2,2-dihydroxymethyl)propylene bromide are heated at 180° C. in diethylene glycol while stirring for 6 h. After cooling, the solution formed is ready for production of an electrochromic formulation.

2) Production of an electrochromically active dye formulation 6 g of titanium dioxide and 0.125 g of ferrocene are dispersed in 3 g of the dye solution prepared according to 1 by a Speedmixer. A brilliant white paste is obtained.

3) Production of an electrochromically active cell

The paste obtained according to 2 is applied to an ITO substrate by knife coating. A further ITO substrate serves as a counter-electrode. Application of a voltage results in a blue color impression at the cathode, which, after reversal of polarity, becomes white again. The switching speed (on) is 80 ms, or 100 ms (off).

An electrochromic formulation is formed with the novel dye. An organic electrochromically switchable electronic component with high switching speed is made using the electrochromic formulation. These components are used to form electrochromic displays. The novel dye has substituents which restrict or prevent π-merization of the aromatic units.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

What is claimed is:

1. An electrochromic formulation which comprises at least one electrochromically active dye which has the following structure:

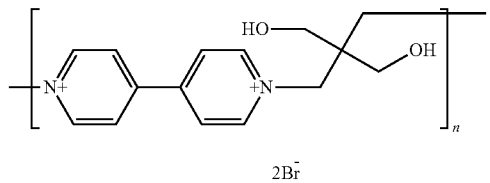

where n is an index representing the degree of polymerization.

2. The formulation as claimed in claim 1, wherein the index n is within a range of from 5 to 300.

3. An organic electrochromic electronic component comprising:
    at least two electrodes; and
    an organic active layer sandwiched between the electrodes, the organic active layer comprising an electrochromically active dye which has the following structure:

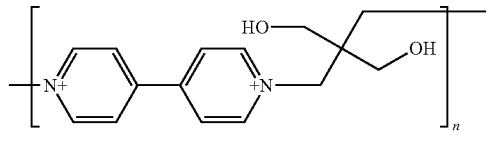

where n is an index representing the degree of polymerization.

4. The electronic component as claimed in claim 3, wherein the index n is within a range of from 5 to 300.

* * * * *

UNITED STATES PATENT AND TRADEMARK OFFICE
CERTIFICATE OF CORRECTION

PATENT NO. : 8,300,296 B2  Page 1 of 1
APPLICATION NO. : 12/926458
DATED : October 30, 2012
INVENTOR(S) : Andreas Kanitz et al.

It is certified that error appears in the above-identified patent and that said Letters Patent is hereby corrected as shown below:

Title Page

Please add (30) Foreign Application Priority Data, May 20, 2008 (DE) 10 2008 024 260.8

Signed and Sealed this
Twenty-second Day of January, 2013

David J. Kappos
*Director of the United States Patent and Trademark Office*